(12) United States Patent
Minami et al.

(10) Patent No.: US 10,256,704 B2
(45) Date of Patent: Apr. 9, 2019

(54) ROTOR FOR ROTARY ELECTRIC MACHINE

(71) Applicant: Mitsubishi Electric Corporation, Tokyo (JP)

(72) Inventors: Shinichiro Minami, Tokyo (JP); Kazunori Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 181 days.

(21) Appl. No.: 15/309,877

(22) PCT Filed: Jun. 26, 2014

(86) PCT No.: PCT/JP2014/066984
§ 371 (c)(1),
(2) Date: Nov. 9, 2016

(87) PCT Pub. No.: WO2015/198446
PCT Pub. Date: Dec. 30, 2015

(65) Prior Publication Data
US 2017/0141657 A1 May 18, 2017

(51) Int. Cl.
*H02K 13/02* (2006.01)
*H02K 19/22* (2006.01)
(Continued)

(52) U.S. Cl.
CPC ............... *H02K 13/02* (2013.01); *B60L 1/00* (2013.01); *H01R 39/16* (2013.01); *H02K 3/46* (2013.01);
(Continued)

(58) Field of Classification Search
CPC ............................. H02K 13/02; H02K 13/003
(Continued)

(56) References Cited

U.S. PATENT DOCUMENTS 4,406,961 A * 9/1983 Pfluger .................. H01R 39/14
310/232
4,618,793 A * 10/1986 Shizuka ................ H01R 39/14
310/232
(Continued)

FOREIGN PATENT DOCUMENTS

DE   10 2005 031 535 A1   1/2007
FR      2 588 430 A1       4/1987
(Continued)

OTHER PUBLICATIONS

How to become an electrician (Year: 2018).*
(Continued)

*Primary Examiner* — Terrance L Kenerly
(74) *Attorney, Agent, or Firm* — Sughrue Mion, PLLC; Richard C. Turner (57) ABSTRACT

A slip ring device includes an insulating molded body in which a pair of slip rings and a pair of connecting conductors are provided. The insulating molded body includes a molded body main body portion disposed in a position further from a rotor main body than a bearing provided on a shaft, the slip rings being provided in the molded body main body portion, an opposing portion disposed between the bearing and the rotor main body, and a pair of beam portions that connect the molded body main body portion to the opposing portion, the connecting conductors being provided respectively in the beam portions. A pair of shaft grooves respectively accommodating the pair of beam portions are provided in the shaft. A spreading suppression portion for preventing resin with which a field coil is impregnated from spreading into the shaft grooves is provided in the opposing portion.

6 Claims, 11 Drawing Sheets

(51) Int. Cl.
*B60L 1/00* (2006.01)
*H02K 3/46* (2006.01)
*H02K 13/00* (2006.01)
*H01R 39/16* (2006.01)
*H01R 39/34* (2006.01)

(52) U.S. Cl.
CPC .......... *H02K 13/003* (2013.01); *H02K 19/22* (2013.01); *H01R 39/34* (2013.01)

(58) Field of Classification Search
USPC ........................................................ 310/232
See application file for complete search history.

(56) References Cited

U.S. PATENT DOCUMENTS

| | | | | |
|---|---|---|---|---|
| 5,521,450 | A | * | 5/1996 | Rondier ................. H01R 39/14 310/232 |
| 5,551,143 | A | * | 9/1996 | Saval ....................... H02K 5/00 29/598 |
| 2008/0197744 | A1 | * | 8/2008 | Herbold ................. H01R 39/14 310/232 |

FOREIGN PATENT DOCUMENTS

| | | | |
|---|---|---|---|
| FR | 2 928 042 A1 | | 8/2009 |
| JP | 60-200745 A | | 10/1985 |
| JP | 5-130757 A | | 5/1993 |
| JP | 0622383 | * 3/1994 | ............ H02K 19/22 |
| JP | 6-44296 Y2 | | 11/1994 |
| JP | 2008-29102 A | | 2/2008 |
| JP | 2009-508456 A | | 2/2009 |
| JP | 2012-125035 A | | 6/2012 |

OTHER PUBLICATIONS

International Search Report for PCT/JP2014/066984 dated Sep. 16, 2014 [PCT/ISA/210].

Communication dated Jan. 19, 2018 from the European Patent Office in counterpart European application No. 14895948.9.

* cited by examiner

ROTOR FOR ROTARY ELECTRIC MACHINE

CROSS REFERENCE TO RELATED APPLICATIONS

This application is a National Stage of International Application No. PCT/JP2014/066984, filed on Jun. 26, 2014, the contents of all of which are incorporated herein by reference in their entirety.

TECHNICAL FIELD

This invention relates to a rotor for a rotary electric machine, in which a slip ring device is attached to a shaft.

BACKGROUND ART

In a conventional rotor for a vehicular AC power generator, a slip ring device is attached to a shaft in order to feed power to a field coil. The slip ring device is formed by integrally molding a pair of slip rings and connection terminals for electrically connecting the field coil to the slip rings in a mold. The shaft is supported in a housing via a pair of bearings. The slip ring device is attached to one of the bearings, and two shaft grooves extending along an axis of the shaft are provided in a part of the shaft to which this bearing is fitted. Beam portions in which the connection terminals are covered by the mold are accommodated respectively in the shaft grooves. The connection terminals pass through the beam portions accommodated in the shaft grooves from the slip rings and extend beyond the bearing so as to reach a side of the bearing opposing the field coil (see PTL 1).

In another conventional rotor for a vehicular AC power generator, improvements are achieved in the electric insulation performance and mechanical strength of a field coil wound around a resin bobbin by impregnating the field coil with thermosetting resin (see PTL 2).

In a further conventional rotor for a vehicular AC power generator, processing for fixing a fusing connection portion reliably, the fusing connection portion being a connecting portion connecting a lead wire of an excitation coil to a connection bar extending from a slip ring, is performed by forming a barrier portion that surrounds the periphery of the fusing connection portion on a part of a cooling fan provided on a side portion of a pole core of the rotor, and providing an insulation treatment agent for fixing the fusing connection portion in the barrier portion (see PTL 3).

CITATION LIST

Patent Literature

[PTL 1] Japanese Patent Application Publication No. H5-130757
[PTL 2] Japanese Patent Application Publication No. 2008-29102
[PTL 3] Japanese Utility Model Application Publication No. H6-44296

SUMMARY OF INVENTION

Technical Problem

However, in the rotor for a vehicular AC power generator according to PTL 1, gaps formed during assembly exist respectively between inner surfaces of the shaft grooves and the beam portions. In the rotor for a vehicular AC power generator according to PTL 2, meanwhile, depending on an amount of impregnated resin and an impregnation method used to impregnate the field coil with the thermosetting resin, surplus applied resin may reach the shaft.

Hence, when the field coil is impregnated with the thermosetting resin in the conventional rotor for a vehicular AC power generator according to PTL 1, the resin may spread through the gaps between the inner surfaces of the shaft grooves and the beam portions of the molded component. When the resin collects in the gaps between the inner surfaces of the shaft grooves and the beam portions and the AC power generator is disposed in a vehicle environment exhibiting wide temperature variation, for example, such that the AC power generator is repeatedly cooled and heated, cracks may form in the molded component. As a result, respective insulating properties between the connection terminals and the slip rings deteriorate. Further, the shaft grooves pass through the inner side of the bearing, and therefore the surplus resin collected in the shaft grooves may spread or harden and fall such that the surplus resin reaches the interior of the bearing from respective side faces of the bearing. As a result, a defect may occur in the bearing.

Furthermore, in the conventional rotor for a vehicular AC power generator according to PTL 3, a disc portion of the fan is partially fixed to a side portion of the pole core by spot welding or the like, and therefore gaps exist in most parts between the disc portion of the fan and the side portion of the pole core. Hence, even when the barrier portion is provided on a part of the fan and the insulating treatment agent is provided in the barrier portion, surplus resin from thermosetting resin with which an excitation coil is impregnated may infiltrate from an outer surface of the barrier portion or flow through the gaps between the side portion of the pole core and the disc portion of the fan so as to spread to the shaft.

This invention has been designed to solve the problems described above, and an object thereof is to obtain a rotor for a rotary electric machine, with which the likelihood of failure of the rotary electric machine can be reduced.

Solution to Problem

A rotor for a rotary electric machine according to this invention includes a shaft capable of rotating about an axis, a rotor main body that includes a field coil impregnated with resin and is fixed to the shaft, and a slip ring device including a pair of slip rings, a pair of connecting conductors for electrically connecting the slip rings to the field coil, and an insulating molded body attached to a part of the shaft that projects from the rotor main body, the slip rings and the connecting conductors being provided in the insulating molded body, wherein the insulating molded body includes a molded body main body portion disposed in a position further from the rotor main body than a bearing provided on the shaft, the slip rings being provided in the molded body main body portion, an opposing portion disposed between the bearing and the rotor main body, and a pair of beam portions that connect the molded body main body portion to the opposing portion, the connecting conductors being provided respectively in the beam portions, a pair of shaft grooves respectively accommodating the beam portions are provided in the shaft, and a spreading suppression portion for preventing the resin with which the field coil is impregnated from spreading into the shaft grooves is provided in the opposing portion.

Advantageous Effects of Invention

With the rotor for a rotary electric machine according to this invention, the spreading suppression portion that prevents the liquid resin with which the field coil is impregnated from spreading into the shaft grooves is provided in the opposing portion of the insulating molded body, and therefore the resin can be prevented from entering gaps between inner surfaces of the shaft grooves and the beam portions. As a result, the likelihood of failure of the rotary electric machine can be reduced.

DESCRIPTION OF EMBODIMENTS

Preferred embodiments of this invention will be described below with reference to the drawings.

First Embodiment

Figure 1:
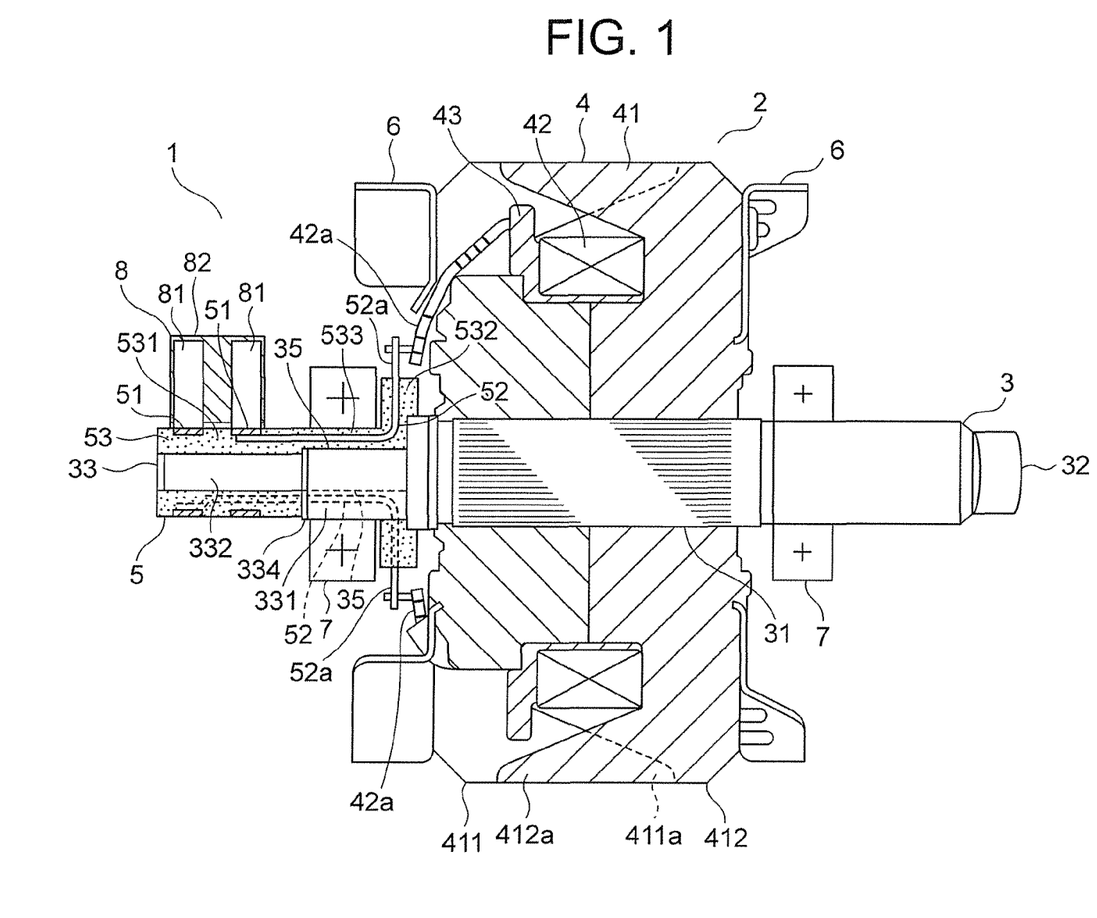
FIG. 1 is a sectional view showing a rotor for a rotary electric machine according to a first embodiment of this invention.

FIG. 1 is a sectional view showing a rotor for a rotary electric machine according to a first embodiment of this invention. In the drawing, a rotary electric machine 1 includes an annular stator (not shown) and a rotor 2 disposed on an inner side of the stator so as to be capable of rotating relative to the stator. The stator and the rotor 2 are supported by a housing, not shown in the drawing. The stator includes an annular stator core (not shown) fixed to the housing and a plurality of stator coils (not shown) provided on the stator core. In this example, a vehicular AC power generator installed in a vehicle serves as the rotary electric machine 1.

The rotor 2 includes a shaft 3, a rotor main body 4 fixed to an intermediate portion of the shaft 3, a slip ring device 5 attached to a part of the shaft 3 that projects from the rotor main body 4, and a pair of fans 6 provided on respective axial direction end surfaces of the rotor main body 4.

The shaft 3 is supported by the housing via a pair of bearings 7 to be free to rotate. The rotor 2 rotates relative to the stator about an axis of the shaft 3. The shaft 3 includes a shaft main body portion 31 to which the rotor main body 4 is fixed, a pulley side shaft portion 32 that projects from one end portion of the shaft main body portion 31, and a brush side shaft portion 33 that projects from another end portion of the shaft main body portion 31. The slip ring device 5 is attached to the brush side shaft portion 33.

A pulley (not shown) coupled to an engine (not shown) via a belt is attached to an end portion of the pulley side shaft portion 32. The shaft 3 is rotated by driving force transmitted to the pulley from the engine. One bearing 7 of the pair of bearings 7 supporting the shaft 3 is fitted to an outer peripheral surface of the pulley side shaft portion 32 by being press-fitted to the pulley side shaft portion 32 from an outer side of the end portion of the pulley side shaft portion 32.

The brush side shaft portion 33 includes a first shaft portion (a groove forming shaft portion) 331 that projects from an end surface of the shaft main body portion 31, and a second shaft portion 332 that projects from an end surface of the first shaft portion 331. An outer diameter of the second shaft portion 332 is set to be smaller than an outer diameter of the first shaft portion 331. As a result, a step portion 334 extending in a circumferential direction of the shaft 3 is formed on a boundary between the first shaft portion 331 and the second shaft portion 332.

A pair of shaft grooves 35 are provided in an outer peripheral surface of the first shaft portion 331 so as to extend in the axial direction of the shaft 3. The shaft grooves 35 are provided at an interval in the circumferential direction of the shaft 3. Further, the shaft grooves 35 extend respectively from positions on the end surface of the shaft main body portion 31 to the boundary (the step portion 334) between the first shaft portion 331 and the second shaft portion 332, and open onto the end surface of the first shaft portion 331. The other bearing 7 of the pair of bearings 7 supporting the shaft 3 is fitted to the outer peripheral surface of the first shaft portion 331 by being press-fitted to the first shaft portion 331 from an outer side of an end portion of the brush side shaft portion 33.

The rotor main body 4 includes a rotor core (a field core) 41 fixed to the shaft main body portion 31, a field coil 42 provided in the rotor core 41, and a resin bobbin 43 interposed between the rotor core 41 and the field coil 42 in order to insulate the field coil 42 electrically from the rotor core 41.

The rotor core 41 includes a first core portion 411 having a plurality of first claw-shaped magnetic pole portions 411*a* and a second core portion 412 having a plurality of second claw-shaped magnetic pole portions 412*a*. The first claw-shaped magnetic pole portions 411*a* are disposed at intervals in a circumferential direction of the rotor core 41, and the second claw-shaped magnetic pole portions 412*a* are likewise disposed at intervals in the circumferential direction of the rotor core 41. The first and second core portions 411, 412 are fixed respectively to the shaft main body portion 31 in a condition where the first and second claw-shaped magnetic pole portions 411*a*, 412*a* are arranged alternately in the circumferential direction of the rotor core 41 and intermeshed. The rotor 2 thus forms a so-called Lundell rotor.

The field coil 42 is disposed in a space formed within the rotor core 41. Two lead wires 42a of the field coil 42 are led out to the exterior of the rotor core 41 from spaces between adjacent first claw-shaped magnetic pole portions 411a. The field coil 42 is impregnated with resin (epoxy resin or the like, for example). The resin with which the field coil 42 is impregnated covers an outermost peripheral portion of the field coil 42, and exists in gaps between wires forming the field coil 42 and a gap between the field coil 42 and the bobbin 43. The resin existing in the gaps between the wires forming the field coil 42 and the gap between the field coil 42 and the bobbin 43 is supplied to the field coil 42 and the bobbin 43 in liquid form and then hardened. By hardening the resin existing in the gaps between the wires forming the field coil 42 and the gap between the field coil 42 and the bobbin 43, improvements are achieved in the electric insulation performance and mechanical strength of the field coil 42 relative to the rotor core 41.

Figure 2:
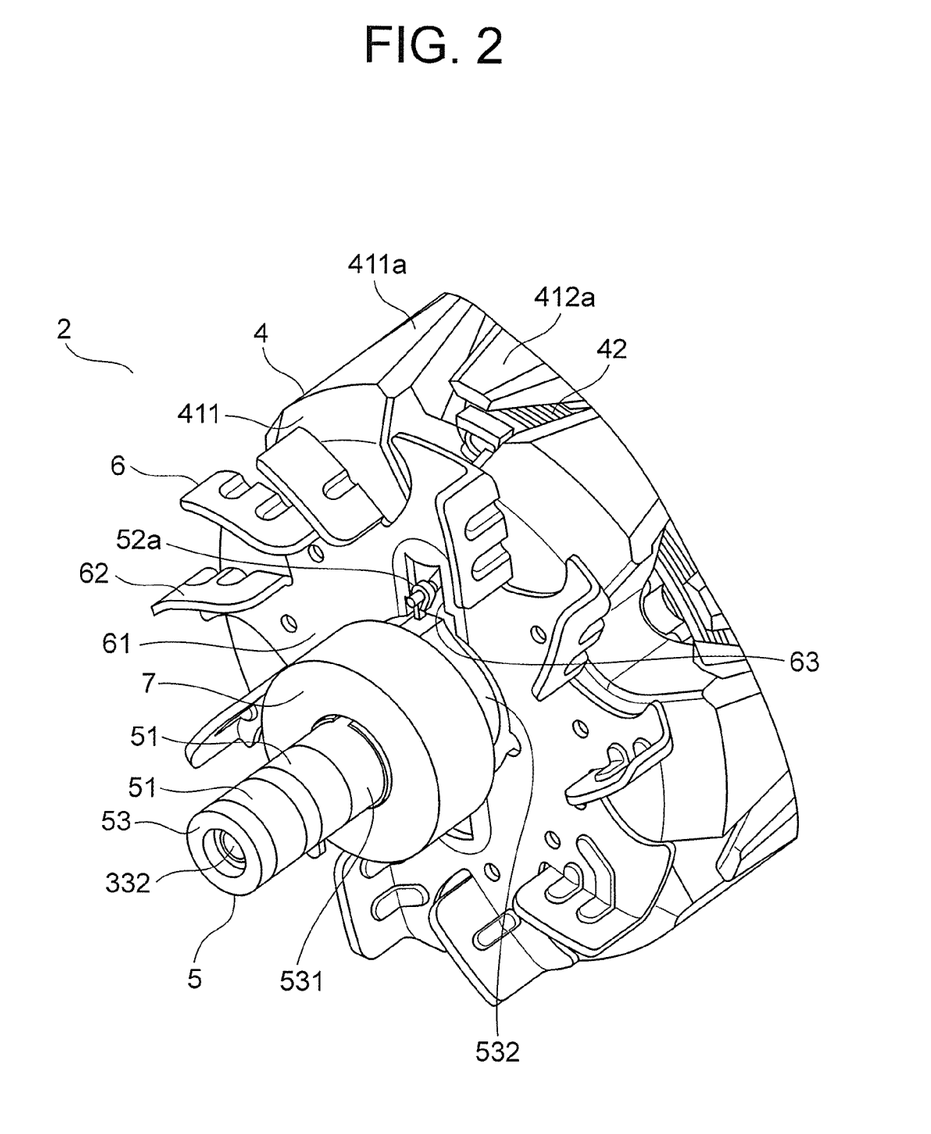
FIG. 2 is a perspective view showing the rotor in a condition where a slip ring device and a bearing are fitted to a brush side shaft portion of FIG. 1.
Figure 3:
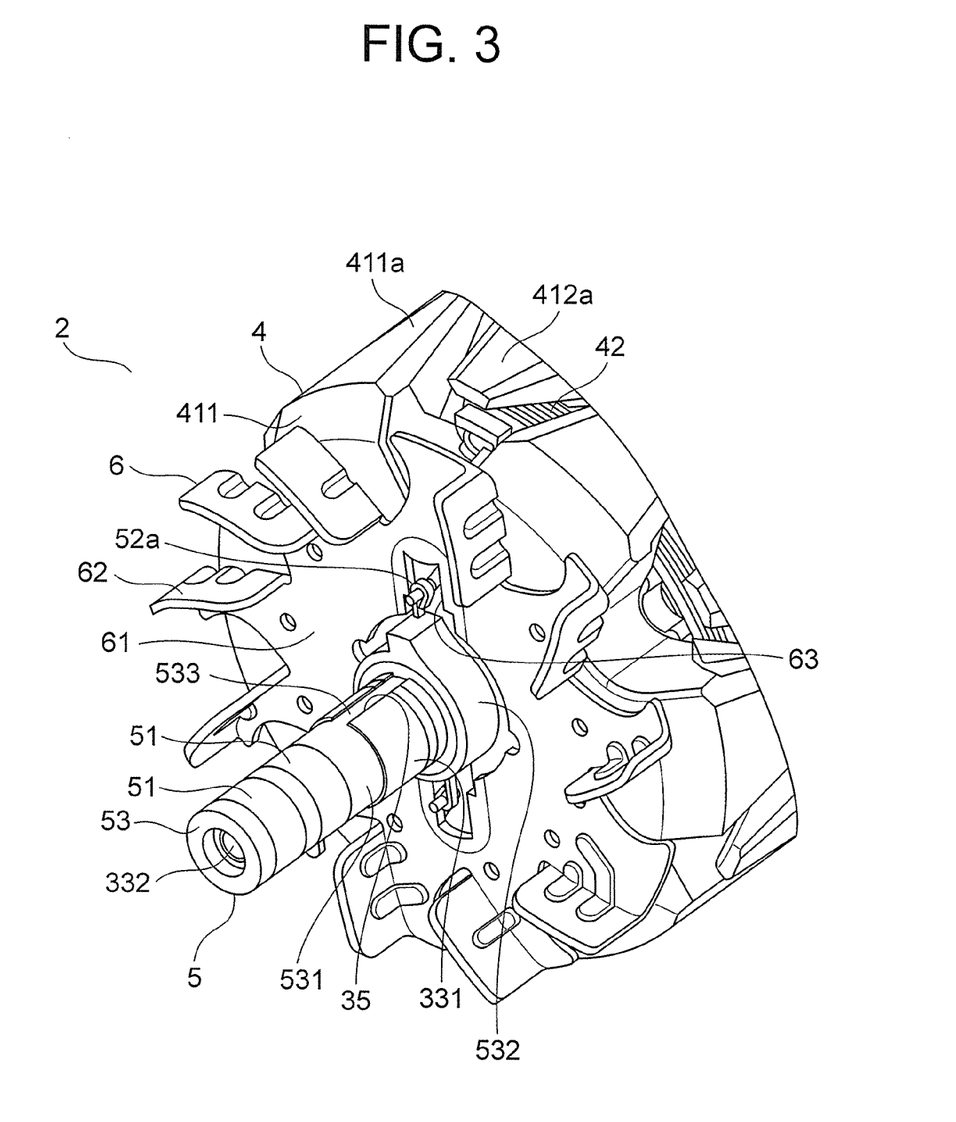
FIG. 3 is a perspective view showing the rotor in a condition where the bearing of FIG. 2 has been removed.
Figure 4:
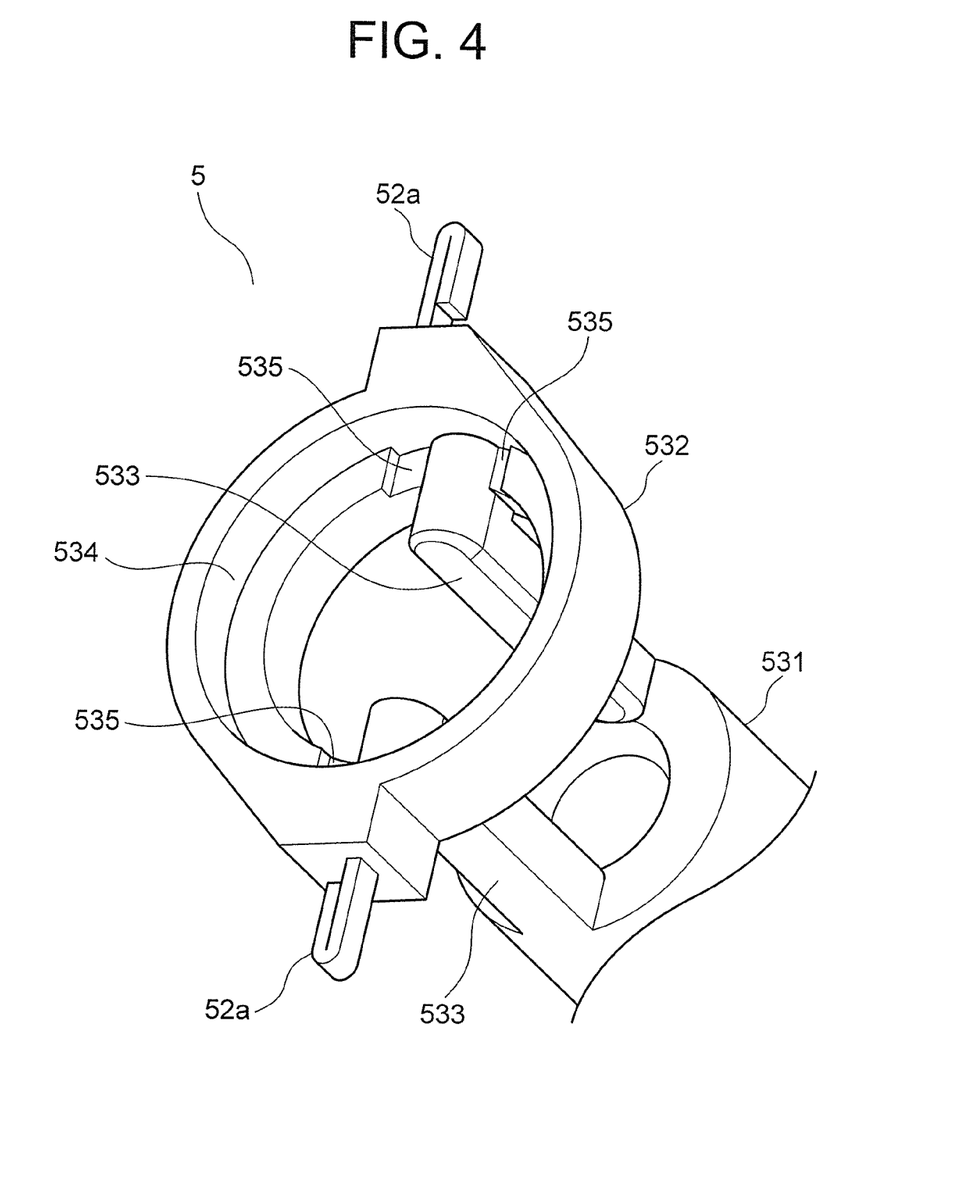
FIG. 4 is a perspective view showing the slip ring device when seen from the side of a rotor main body in FIG. 3.

FIG. 2 is a perspective view showing the rotor 2 in a condition where the slip ring device 5 and the bearing 7 are attached to the brush side shaft portion 33 of FIG. 1. Further, FIG. 3 is a perspective view showing the rotor 2 in a condition where the bearing 7 of FIG. 2 has been removed, and FIG. 4 is a perspective view showing the slip ring device 5 when seen from the side of the rotor main body 4 in FIG. 3. The slip ring device 5 includes a pair of metal (in this example, copper) slip rings 51, a pair of connecting conductors 52 for electrically connecting the slip rings 51 to the field coil 42, and a molded body (an insulating molded body) 53 attached to the brush side shaft portion 33, the slip rings 51 and the connecting conductors 52 being provided in the molded body 53.

The molded body 53 serves as a resin electric insulator. Further, the molded body 53 is molded by pouring resin into a molding die in which the slip rings 51 and the connecting conductors 52 are disposed, and hardening the resin. Furthermore, the molded body 53 includes a tubular molded body main body portion 531 fitted to the second shaft portion 332, an opposing portion 532 disposed in a position closer to the rotor main body 4 than the molded body main body portion 531, and a pair of beam portions 533 that connect the molded body main body portion 531 to the opposing portion 532 and are accommodated individually in the respective shaft grooves 35.

The second shaft portion 332 is inserted into the molded body main body portion 531 and fitted to the molded body main body portion 531. As a result, the molded body main body portion 531 is disposed in a position further from the rotor main body 4 in the axial direction of the shaft 3 than the bearing 7 fitted to the first shaft portion 331. The molded body main body portion 531 is attached to the second shaft portion 332 so as to contact the end surface of the first shaft portion 331 (i.e. the step portion 334). An outer diameter of the molded body main body portion 531 is set to be equal to or smaller than the outer diameter of the first shaft portion 331.

The opposing portion 532 is formed in an annular shape so as to surround the shaft 3. The opposing portion 532 is disposed between the rotor main body 4 and the bearing 7 fitted to the first shaft portion 331. Further, the opposing portion 532 is disposed in the position of a boundary between the shaft main body portion 31 and the first shaft portion 331. As shown in FIG. 4, a recessed portion 534 that surrounds the periphery of the shaft 3 is provided in a rotor main body 4 side end surface of the opposing portion 532.

The beam portions 533 pass through the respective shaft grooves 35 from the end surface of the molded body main body portion 531, and are connected to an inner peripheral surface of the opposing portion 532. As a result, the beam portions 533 pass respectively through an inner side of the bearing 7 fitted to the outer peripheral surface of the first shaft portion 331 so as to extend from the molded body main body portion 531 to the opposing portion 532.

The slip rings 51 are provided on an outer peripheral portion of the molded body main body portion 531 so as to surround the molded body main body portion 531. The slip rings 51 are embedded in the molded body main body portion 531 such that respective outer peripheral surfaces thereof are exposed to the outside. Moreover, the slip rings 51 are provided in the molded body main body portion 531 at an interval in the axial direction of the shaft 3.

The connecting conductors 52 extend respectively from the slip rings 51 through the molded body main body portion 531, the beam portions 533, and the opposing portion 532 in that order, and project to the outside from the outer peripheral surface of the opposing portion 532. Parts of the connecting conductors 52 that project to the outside from the opposing portion 532 respectively serve as exposed end portions 52a of the connecting conductors 52. Further, the exposed end portions 52a of the connecting conductors 52 are connected individually to the two lead wires 42a of the field coil 42. As a result, the field coil 42 is electrically connected to the slip rings 51.

Here, when the field coil 42 is impregnated with liquid resin, liquid resin adhered to the rotor main body 4, for example, may travel over the opposing portion 532 so as to enter (spread into) gaps between inner surfaces of the respective shaft grooves 35 and the beam portions 533. As shown in FIG. 4, a plurality of indentation portions (spreading suppression portions) 535 are provided in the opposing portion 532 to prevent the liquid resin from spreading into the shaft grooves 35 from the opposing portion 532. The indentation portions 535 are molded integrally with the molded body 53 when the molded body 53 is molded. The indentation portions 535 open onto the rotor main body 4. The liquid resin traveling over the opposing portion 532 collects in the indentation portions 535, whereby movement thereof is stopped.

In this example, the indentation portions 535 are provided in a bottom surface of the recessed portion 534. Further, in this example, the indentation portions 535 contact the beam portions 533 on respective sides of the beam portions 533 in the circumferential direction of the opposing portion 532. Furthermore, in this example, bottom surfaces of the respective indentation portions 535 are parallel to the bottom surface of the recessed portion 534 such that steps are formed between the bottom surface of the recessed portion 534 and the bottom surfaces of the indentation portions 535.

As shown in FIGS. 2 and 3, each of the fans 6 includes an attachment plate portion 61 fixed to an end surface of the rotor main body 4, and a plurality of vane portions 62 provided on an outer peripheral portion of the attachment plate portion 61. The vane portions 62 are disposed at intervals in a rotation direction of the rotor 2. An opening portion 63 through which the lead wires 42a of the field coil 42 pass is provided in the attachment plate portion 61 of the slip ring device 5 side fan 6, among the pair of fans 6.

A brush device 8 shown in FIG. 1 is provided in the housing that supports the rotor 2. The brush device 8 includes a pair of brushes 81 individually contacting the slip rings 51, a brush holder 82 that holds the brushes 81, and a spring (not shown) that biases the brushes 81 individually in a direction for contacting the slip rings 51. When the rotor 2 rotates, the slip rings 51 slide against the respective brushes 81.

In the rotor 2, when power is fed to the field coil 42 from a battery (not shown) via the brushes 81 and the slip ring device 5, magnetic poles (an N pole and an S pole) are generated respectively in the first and second claw-shaped magnetic pole portions 411*a*, 412*a*. Further, when the pulley receives the driving force of the engine, the rotor 2 rotates about the axis of the shaft 3. As a result, a rotating magnetic field is applied to the stator core from the rotor 2. When the rotating magnetic field is applied to the stator core, electromotive force is generated in the stator coil.

To manufacture the rotor 2, the rotor main body 4 and the slip ring device 5 are attached to the shaft 3 in order of the rotor main body 4 and the slip ring device 5, whereupon the fan 6 is attached to the rotor main body 4. The field coil 42 is then impregnated with liquid resin. The field coil 42 of the rotor main body 4 is impregnated with resin by, for example, partially submerging the rotor main body 4 under the liquid surface of liquid resin stored in a resin tank and then rotating the rotor 2. At this time, the resin is also interposed in the gap between the field coil 42 and the bobbin 43.

When the field coil 42 is impregnated with the resin, liquid resin adhered to the rotor main body 4 may travel over the surface of the first core portion 411 and so on, for example, so as to reach the opposing portion 532 and the recessed portion 534. At this time, the resin collects in the indentation portions 535, and is thereby prevented from moving into the shaft grooves 35 from the opposing portion 532.

The liquid resin existing (impregnated) between the wires forming the field coil 42 and the gap between the field coil 42 and the bobbin 43 is then hardened by cooling the rotor 2. The rotor 2 is thus manufactured.

In the rotary electric machine 1 described above, the indentation portions 535 that prevent the liquid resin from moving into the shaft grooves 35 from the opposing portion 532 are provided in the opposing portion 532, and therefore resin can be prevented from entering the gaps between the inner surfaces of the shaft grooves 35 and the beam portions 533 during the operation for impregnating the field coil 42 with liquid resin, for example. As a result, defects (for example, a defect in which a crack is formed in the molded body 53 such that the slip rings 51 and the connecting conductors 52 can no longer be insulated from the respective peripheries thereof) occurring when resin hardens in the gaps between the inner surfaces of the shaft grooves 35 and the beam portions 533 or defects (for example, when a ball bearing is used as the bearing 7, early failure of the bearing 7 such as early abrasion on a sliding surface of the ball, rapid deterioration of a lubricant used in the bearing 7, and ball sticking caused by the resin) occurring when resin collected in the gaps between the inner surfaces of the shaft grooves 35 and the beam portions 533 infiltrates the bearings 7 can be prevented, thereby preventing the possibility of failure of the rotary electric machine 1.

Further, the indentation portions 535 serve as the spreading suppression portions for stopping movement of the liquid resin, and therefore movement of the resin can be stopped by a simple configuration.

Furthermore, the indentation portions 535 contact the beam portions 533, and therefore movement of the liquid resin can be stopped in the parts of the opposing portion 532 that are connected to the beam portions 533. As a result, the resin can be prevented from entering the shaft grooves 35 effectively.

Note that in the example described above, the indentation portions 535 provided in the bottom surface of the recessed portion 534 contact the beam portions 533, but the indentation portions 535 may be provided in the bottom surface of the recessed portion 534 in positions removed from the beam portions 533. Further, in the example described above, four indentation portions 535 are provided in the bottom surface of the recessed portion 534, but the number of indentation portions 535 provided in the bottom surface of the recessed portion 534 is not limited to four, and may be set at one, two, three, five, or more.

Second Embodiment

Figure 5:
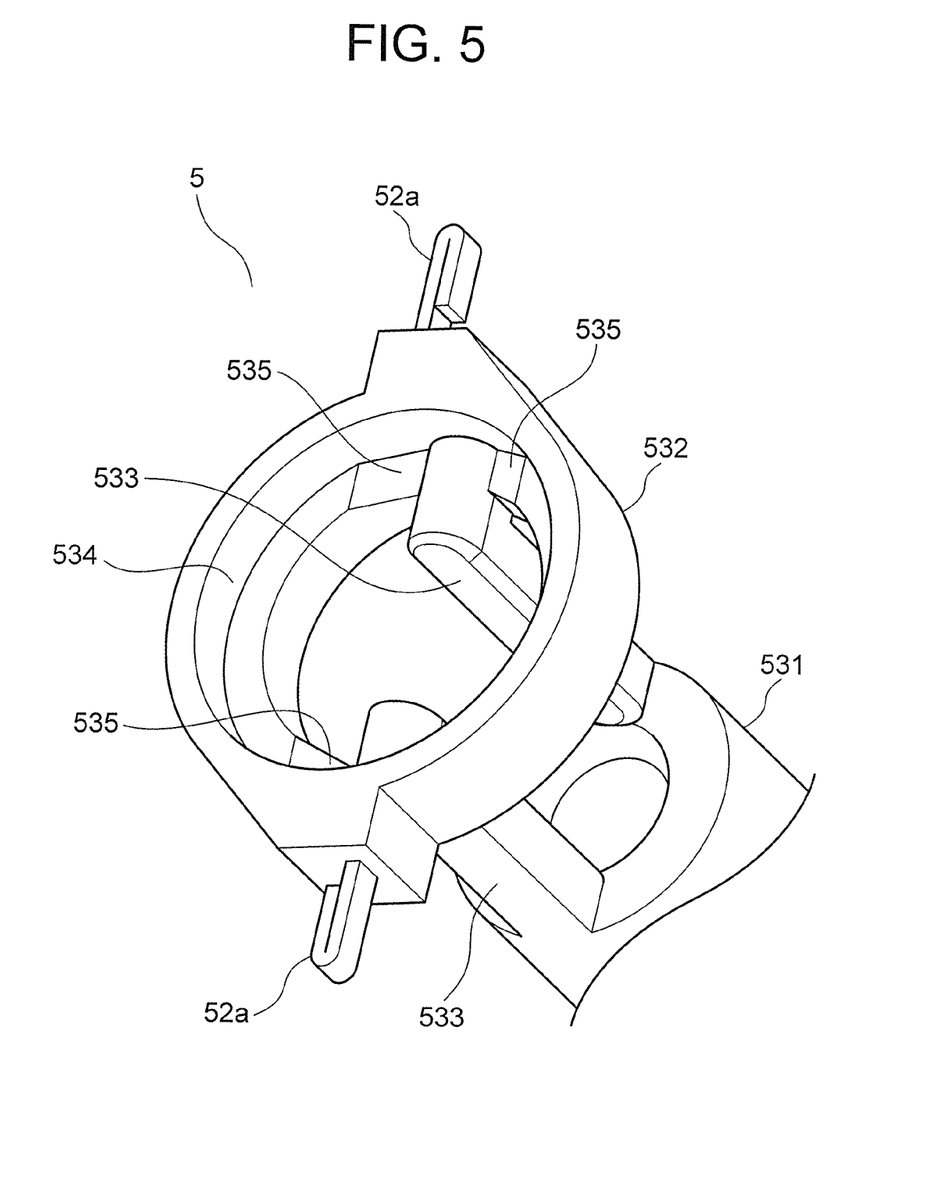
FIG. 5 is a perspective view showing a slip ring device provided in a rotor for a rotary electric machine according to a second embodiment of this invention.

FIG. 5 is a perspective view showing a slip ring device provided in a rotor for a rotary electric machine according to a second embodiment of this invention. Note that FIG. 5 corresponds to FIG. 4 of the first embodiment. In this embodiment, the bottom surfaces of the respective indentation portions 535 are formed as inclined surfaces inclined relative to the bottom surface of the recessed portion 534. Further, an incline direction of the bottom surfaces of the indentation portions 535 is set such that a depth dimension of the indentation portions 535 increases toward the beam portions 533. In other words, the bottom surfaces of the indentation portions 535 are inclined in a direction heading away from the rotor main body 4 toward the beam portions 533. All other configurations are identical to the first embodiment.

Movement of the resin can be stopped by the indentation portions 535 likewise when the bottom surfaces of the indentation portions 535 are formed as inclined surfaces in this manner, and therefore the resin can be prevented from entering the shaft grooves 35.

Note that the indentation portions 535 according to the first embodiment and the indentation portions 535 according to the second embodiment may be provided in a common opposing portion 532.

Third Embodiment

Figure 6:
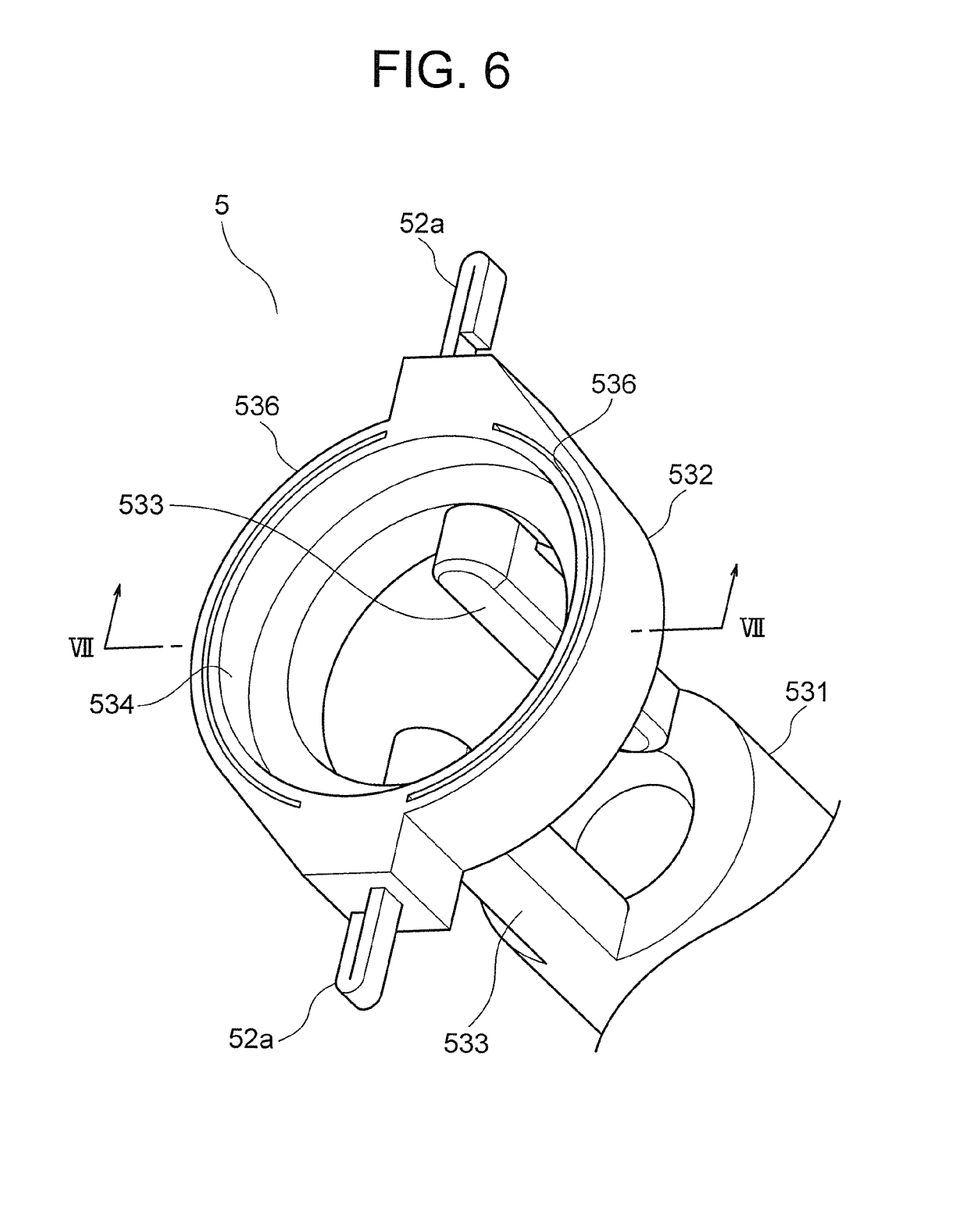
FIG. 6 is a perspective view showing a slip ring device provided in a rotor for a rotary electric machine according to a third embodiment of this invention.
Figure 7:
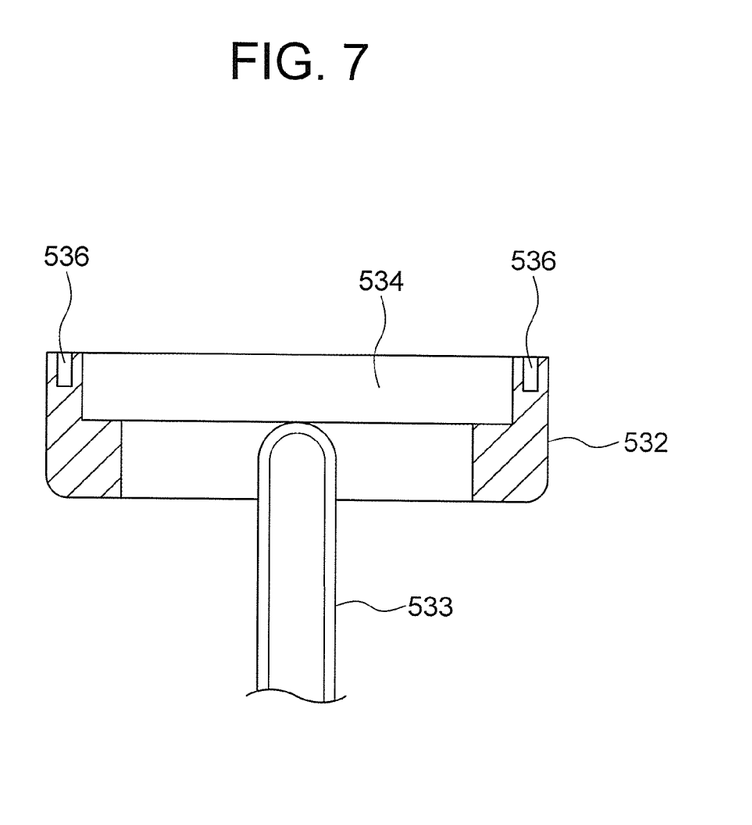
FIG. 7 is a sectional view taken along a VII-VII line in FIG. 6.

FIG. 6 is a perspective view showing a slip ring device provided in a rotor for a rotary electric machine according to a third embodiment of this invention. Further, FIG. 7 is a sectional view taken along a VII-VII line in FIG. 6. Note that FIG. 6 corresponds to FIG. 4 of the first embodiment. In this embodiment, a pair of resin accommodating grooves 536 extending in the circumferential direction of the shaft 3 are provided on a rotor main body 4 side end surface of the opposing portion 532 as the spreading suppression portions for preventing the liquid resin from spreading into the shaft grooves 35 from the opposing portion 532. The pair of resin accommodating grooves 536 are provided in the rotor main body 4 side end surface of the opposing portion 532 so as to avoid ranges of the respective beam portions 533 in a radial direction of the opposing portion 532. As a result, interference is avoided between the resin accommodating grooves 536 and the connecting conductors 52 in the opposing portion 532. Furthermore, the resin accommodating grooves 536 are formed between the outer peripheral surface of the opposing portion 532 and an inner peripheral surface of the recessed portion 534. The resin accommodating grooves 536 are molded integrally with the molded body 53 when the molded body 53 is molded. Note that in this embodiment, the indentation portions 535 are not provided in the opposing portion 532. All other configurations are identical to the first embodiment.

By providing the resin accommodating grooves 536 in the rotor main body 4 side end surface of the opposing portion 532 in this manner, surplus resin can be prevented from moving by the resin accommodating grooves 536 in positions close to the rotor main body 4 from the viewpoint of the opposing portion 532. As a result, the resin can be prevented from entering the shaft grooves 35 even more reliably.

Fourth Embodiment

Figure 8:
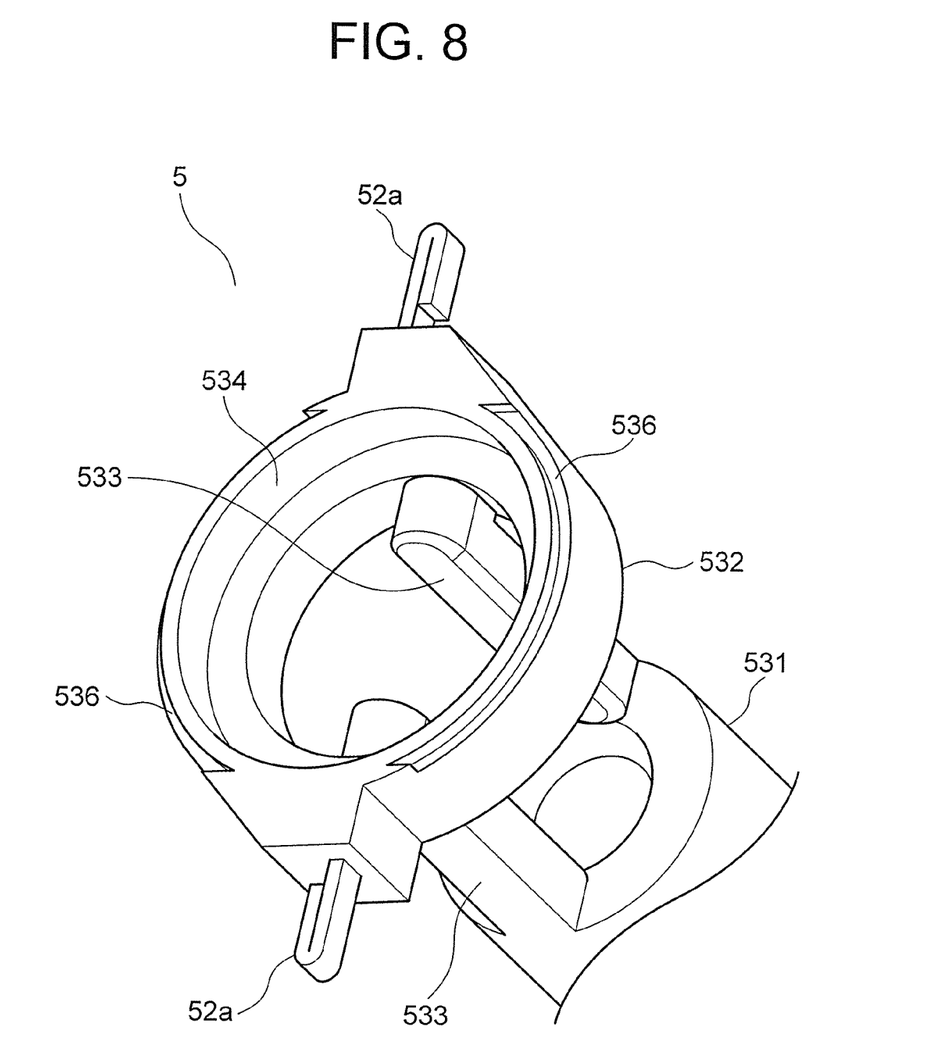
FIG. 8 is a perspective view showing a slip ring device provided in a rotor for a rotary electric machine according to a fourth embodiment of this invention.

FIG. 8 is a perspective view showing a slip ring device provided in a rotor for a rotary electric machine according to a fourth embodiment of this invention. Note that FIG. 8 corresponds to FIG. 4 of the first embodiment. The pair of resin accommodating grooves 536 are provided on a boundary between the rotor main body 4 side end surface of the opposing portion 532 and the outer peripheral surface of the opposing portion 532. Steps are formed on the boundary between the end surface and the outer peripheral surface of the opposing portion 532 by respective inner surfaces of the resin accommodating grooves 536. All other configurations are identical to the third embodiment.

By providing the resin accommodating grooves 536 on the boundary between the rotor main body 4 side end surface of the opposing portion 532 and the outer peripheral surface of the opposing portion 532 in this manner, the shape of the molding die used to mold to the molded body 53 can be simplified in comparison with the third embodiment. More specifically, in the third embodiment, extremely narrow projecting portions must be provided on the molding die in order to provide the resin accommodating grooves 536 in the molded body 53, whereas in this embodiment, this is not necessary, and therefore the shape of the molding die can be simplified. As a result, the lifespan of the molding die used to mold the molded body 53 can be extended, and moreover the resin can flow through the molding die more favorably such that defects in the molded body 53 can be reduced, enabling an improvement in the production efficiency of the rotor 2.

Note that in the third and fourth embodiments, two resin accommodating grooves 536 are provided, but three or more resin accommodating grooves 536 may be provided intermittently in the circumferential direction of the shaft 3. Moreover, the number of resin accommodating grooves 536 provided in the opposing portion 532 may be set at one.

Fifth Embodiment

Figure 9:
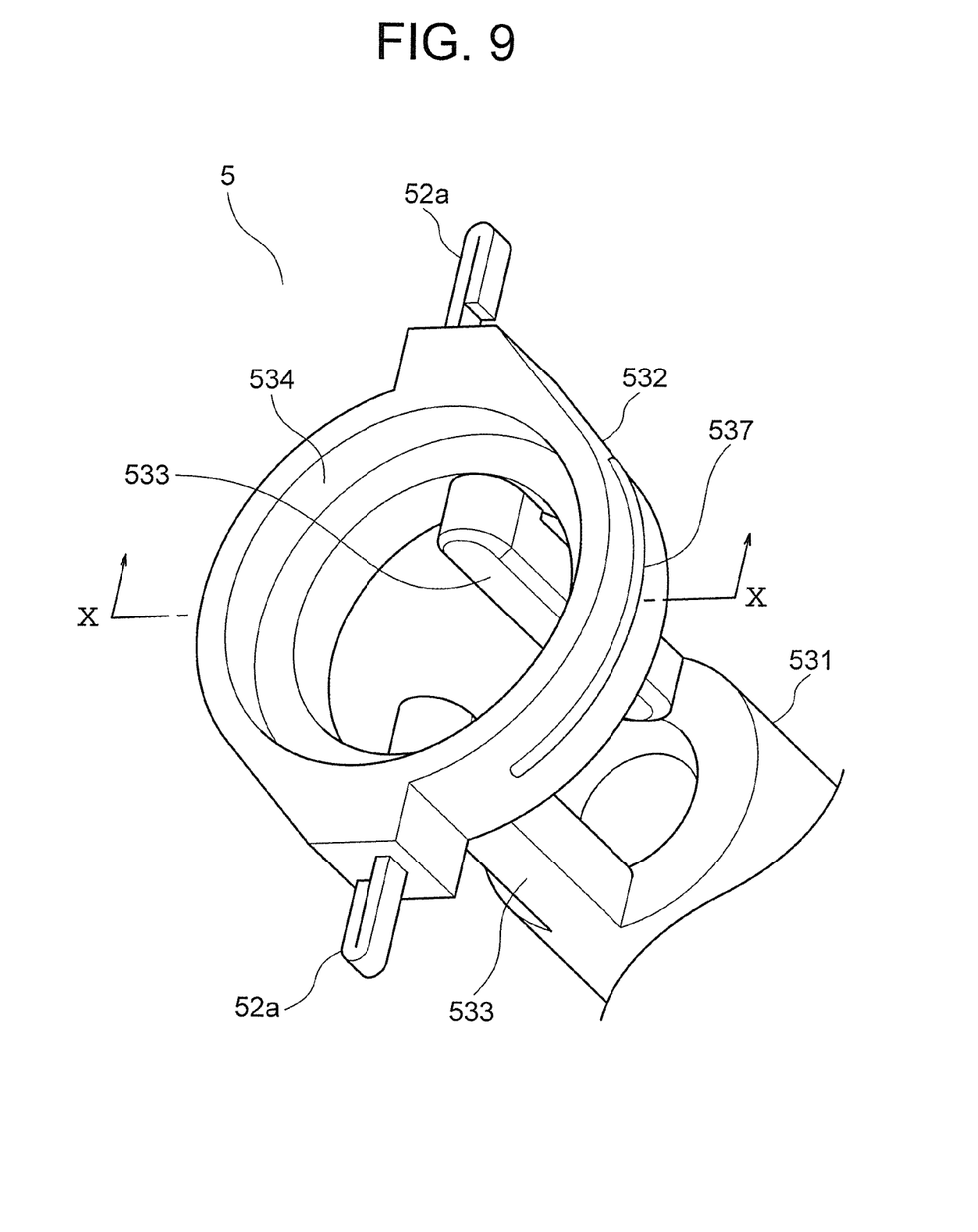
FIG. 9 is a perspective view showing a slip ring device provided in a rotor for a rotary electric machine according to a fifth embodiment of this invention.
Figure 10:
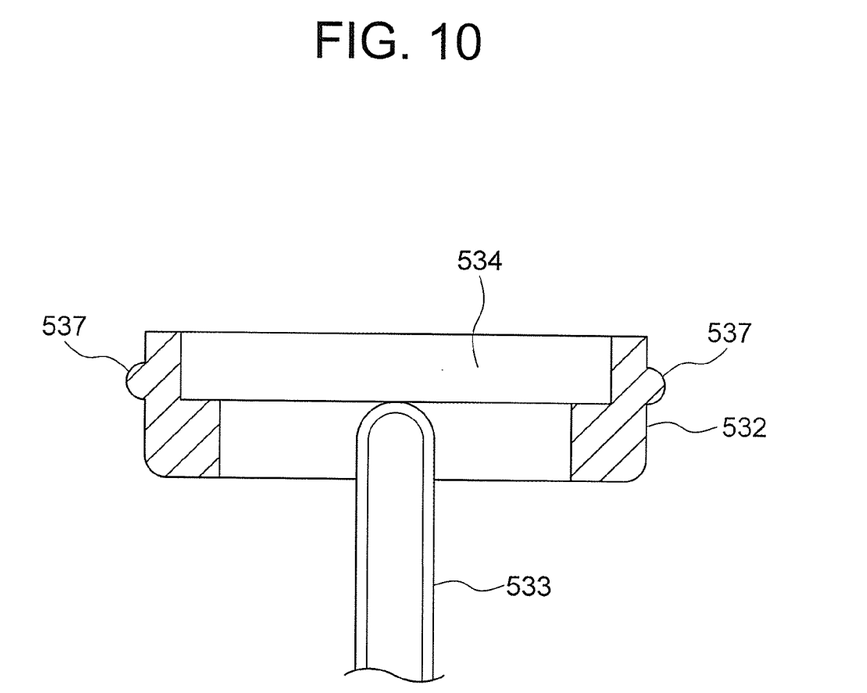
FIG. 10 is a sectional view taken along an X-X line in FIG. 9.

FIG. 9 is a perspective view showing a slip ring device provided in a rotor for a rotary electric machine according to a fifth embodiment of this invention. Further, FIG. 10 is a sectional view taken along an X-X line in FIG. 9. Note that FIG. 9 corresponds to FIG. 4 of the first embodiment. In this embodiment, a pair of projections 537 extending in the circumferential direction of the opposing portion 532 are provided on the outer peripheral surface of the opposing portion 532 as the spreading suppression portions for preventing the liquid resin from spreading into the shaft grooves 35 from the opposing portion 532. The projections 537 project outwardly in the radial direction of the opposing portion 532 from the outer peripheral surface of the opposing portion 532. The pair of projections 537 are provided on the outer peripheral surface of the opposing portion 532 so as to avoid the exposed end portions 52a of the respective connecting conductors 52. The projections 537 are molded integrally with the molded body 53 when the molded body 53 is molded. The indentation portions 535 and the resin accommodating grooves 536 are not provided in the opposing portion 532. All other configurations are identical to the first embodiment.

By providing the projections 537 on the outer peripheral surface of the opposing portion 532 so as to extend in the circumferential direction of the opposing portion 532 in this manner, movement of the liquid resin into the shaft grooves 35 from the outer peripheral surface of the opposing portion 532 can be stopped by the projections 537, and as a result, the resin can be effectively prevented from entering the shaft grooves 35 from the outer peripheral surface of the opposing portion 532.

Figure 11:
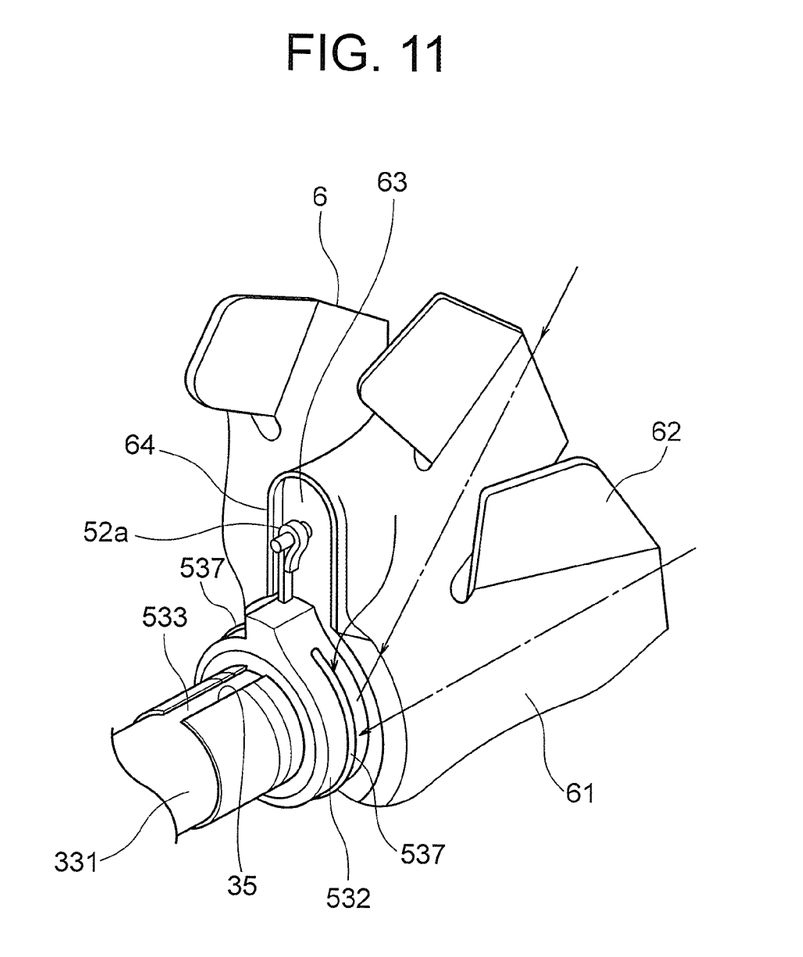
FIG. 11 is a perspective view showing a fan provided in a rotor for a rotary electric machine according to a modified example of the fifth embodiment of this invention.

Furthermore, FIG. 11 is a perspective view showing a fan provided in a rotor for a rotary electric machine according to a modified example of the fifth embodiment of this invention. Note that a solid line arrow in FIG. 11 indicates resin movement over a front surface of the attachment plate portion 61, and dot-dash line arrows in FIG. 11 indicate resin movement over a rear surface of the attachment plate portion 61. A barrier 64 is provided on the attachment plate portion 61 of the slip ring device 5 side fan 6 so as to rise up from an outer peripheral portion of the opening portion 63 in a direction heading away from the rotor main body 4. The barrier 64 covers the exposed end portions 52a of the connecting conductors 52 individually. Liquid resin that travels over the fan 6 from the rotor main body 4 so as to reach the opposing portion 532 during manufacture of the rotor 2 travels over the barrier 64 so as to be led to the projections 537 while avoiding the exposed end portions 52a of the connecting conductors 52. All other configurations are identical to the fifth embodiment.

In this modified example of the fifth embodiment, the projections 537 are provided on the outer peripheral surface of the opposing portion 532 so as to avoid the exposed end portions 52a of the connecting conductors 52, and the barrier 64 covering the exposed end portions 52a of the connecting conductors 52 is provided on the attachment plate portion 61 of the fan 6. Accordingly, the barrier 64 can prevent the surplus resin from spreading likewise on the periphery of the exposed end portions 52a, where it is difficult in terms of the configuration of the molding die to provide the projections 537, and as a result, the likelihood of failure of the rotary electric machine 1 can be reduced even more effectively.

Note that two or more spreading suppression portions, among the indentation portions 535 of the first embodiment, the indentation portions 535 of the second embodiment, the resin accommodating grooves 536 of the third embodiment, the resin accommodating grooves 536 of the fourth embodiment, and the projections 537 of the fifth embodiment, may be provided in a common opposing portion 532.

Further, in the respective embodiments, the opposing portion 532 is formed in an annular shape so as to surround the shaft 3, but the opposing portion 532 is not limited thereto, and may be formed in a polygonal shape, for example. Alternatively, instead of forming the opposing portion 532 in an annular shape, a pair of opposing portions 532 may be disposed at an interval in the circumferential direction of the shaft 3, and the opposing portions 532 may be fixed individually to the pair of beam portions 533.

Furthermore, in the embodiments described above, this invention is applied to the rotor 2 for a vehicular AC power generator, but this invention may also be applied to a rotor for an AC power generator used in an outboard motor, a rotor for an AC generator/motor, and so on, for example.

The invention claimed is:

1. A rotor for a rotary electric machine, comprising:
a shaft capable of rotating about an axis;
a rotor main body that includes a field coil impregnated with resin and is fixed to the shaft; and
a slip ring device including a pair of slip rings, a pair of connecting conductors for electrically connecting the slip rings to the field coil, and an insulating molded body attached to a part of the shaft that projects from the rotor main body, the slip rings and the connecting conductors being provided in the insulating molded body,
wherein the insulating molded body includes a molded body main body portion disposed in a position further from the rotor main body than a bearing provided on the shaft, the slip rings being provided in the molded body main body portion, an opposing portion disposed between the bearing and the rotor main body, and a pair of beam portions that connect the molded body main body portion to the opposing portion, the connecting conductors being provided respectively in the beam portions,
a pair of shaft grooves respectively accommodating the beam portions are provided in the shaft,
a spreading suppression portion for preventing the resin with which the field coil is impregnated from spreading into the shaft grooves is provided in the opposing portion,
an indentation portion that opens onto the rotor main body is provided in the opposing portion as the spreading suppression portion, and
the spreading suppression portion contacts the beam portions.

2. The rotor for a rotary electric machine according to claim 1, wherein the rotor is employed in a vehicular AC power generator serving as a rotary electric machine.

3. A rotor for a rotary electric machine, comprising:
a shaft capable of rotating about an axis;
a rotor main body that includes a field coil impregnated with resin and is fixed to the shaft; and
a slip ring device including a pair of slip rings, a pair of connecting conductors for electrically connecting the slip rings to the field coil, and an insulating molded body attached to a part of the shaft that projects from the rotor main body, the slip rings and the connecting conductors being provided in the insulating molded body,
wherein the insulating molded body includes a molded body main body portion disposed in a position further from the rotor main body than a bearing provided on the shaft, the slip rings being provided in the molded body main body portion, an opposing portion disposed between the bearing and the rotor main body, and a pair of beam portions that connect the molded body main body portion to the opposing portion, the connecting conductors being provided respectively in the beam portions,
a pair of shaft grooves respectively accommodating the beam portions are provided in the shaft,
a spreading suppression portion for preventing the resin with which the field coil is impregnated from spreading into the shaft grooves is provided in the opposing portion,
a resin accommodating groove extending in a circumferential direction of the shaft is provided in an end surface of the opposing portion on the rotor main body side as the spreading suppression portion,
the resin accommodating groove is provided in the end surface so as to avoid circumferential ranges of the respective beam portions in a radial direction of the opposing portion.

4. The rotor for a rotary electric machine according to claim 3, wherein the rotor is employed in a vehicular AC power generator serving as a rotary electric machine.

5. A rotor for a rotary electric machine, comprising:
a shaft capable of rotating about an axis;
a rotor main body that includes a field coil impregnated with resin and is fixed to the shaft; and
a slip ring device including a pair of slip rings, a pair of connecting conductors for electrically connecting the slip rings to the field coil, and an insulating molded body attached to a part of the shaft that projects from the rotor main body, the slip rings and the connecting conductors being provided in the insulating molded body,
wherein the insulating molded body includes a molded body main body portion disposed in a position further from the rotor main body than a bearing provided on the shaft, the slip rings being provided in the molded body main body portion, an opposing portion disposed between the bearing and the rotor main body, and a pair of beam portions that connect the molded body main body portion to the opposing portion, the connecting conductors being provided respectively in the beam portions,
a pair of shaft grooves respectively accommodating the beam portions are provided in the shaft,
a spreading suppression portion for preventing the resin with which the field coil is impregnated from spreading into the shaft grooves is provided in the opposing portion,
a projection extending in a circumferential direction of the opposing portion is provided in an outer peripheral surface of the opposing portion as the spreading suppression portion,
the projection is provided in the outer peripheral surface of the opposing portion so as to avoid the exposed end portions of the respective connecting conductors.

6. The rotor for a rotary electric machine according to claim 5, wherein the rotor is employed in a vehicular AC power generator serving as a rotary electric machine.

* * * * *